Dec. 16, 1958 J. M. SHOUP 2,864,593
MIXER FOR FEED AND THE LIKE
Filed Jan. 6, 1958 3 Sheets-Sheet 1
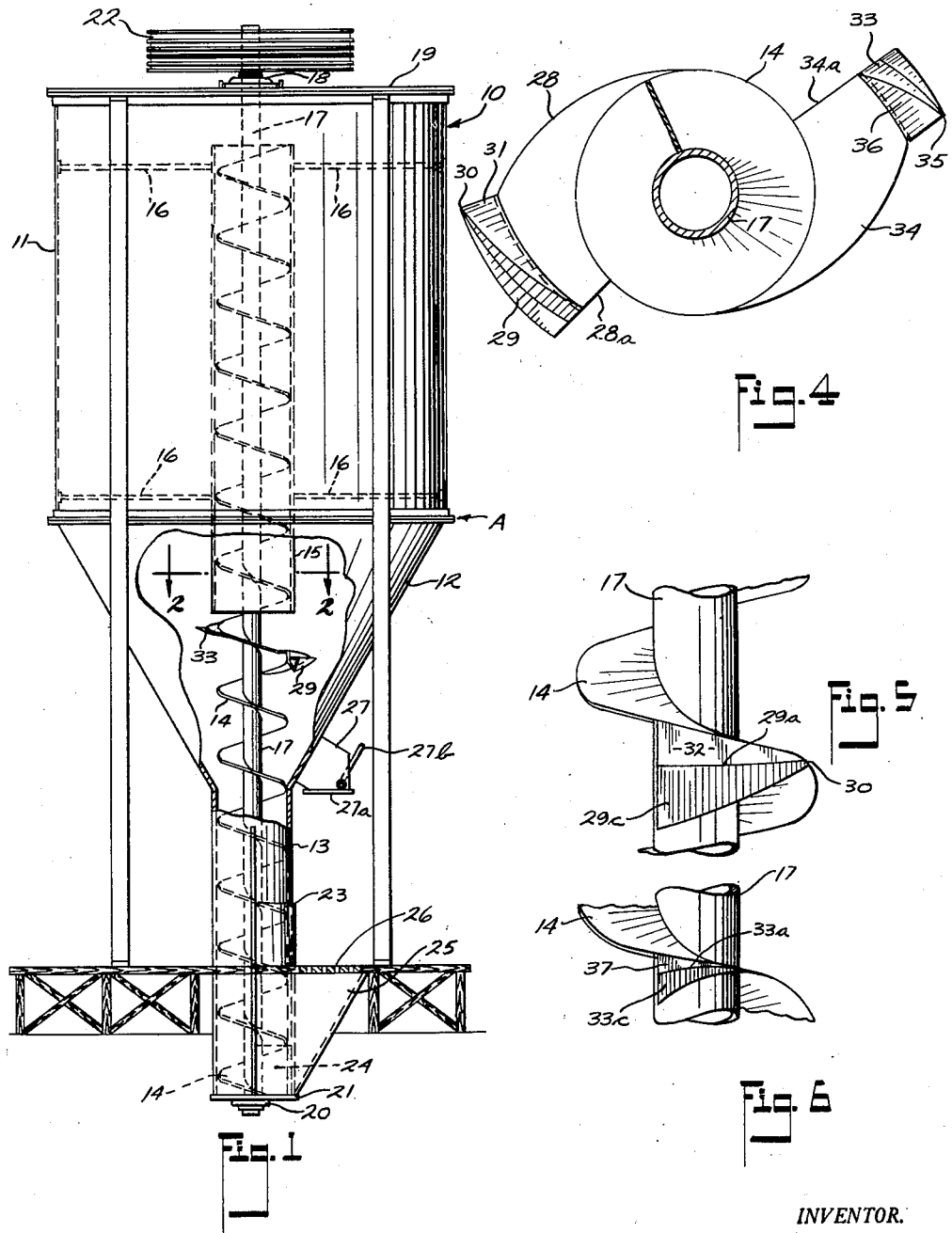
INVENTOR.
JOHN M. SHOUP
BY
Hyde, Meyer, Baldwin & Doran
ATTORNEYS Dec. 16, 1958 J. M. SHOUP 2,864,593
MIXER FOR FEED AND THE LIKE
Filed Jan. 6, 1958 3 Sheets-Sheet 2
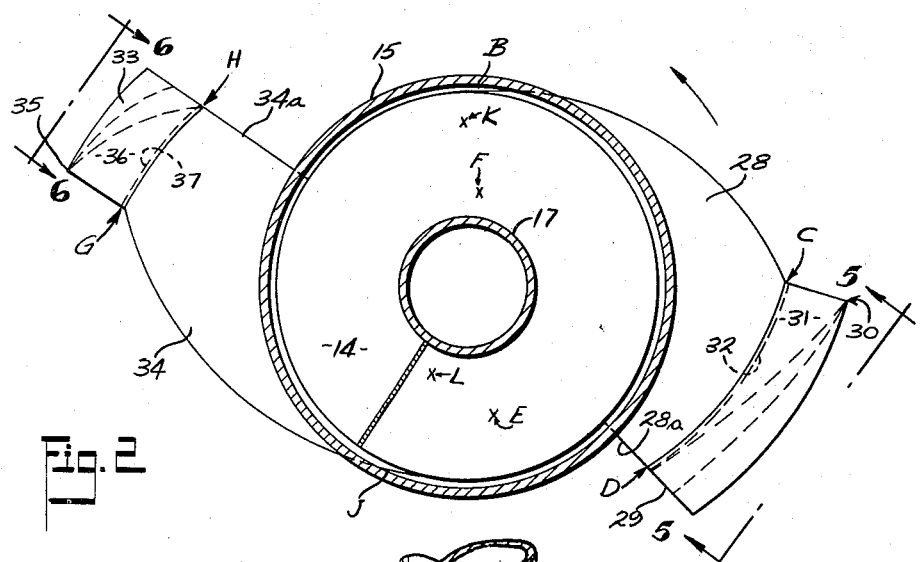
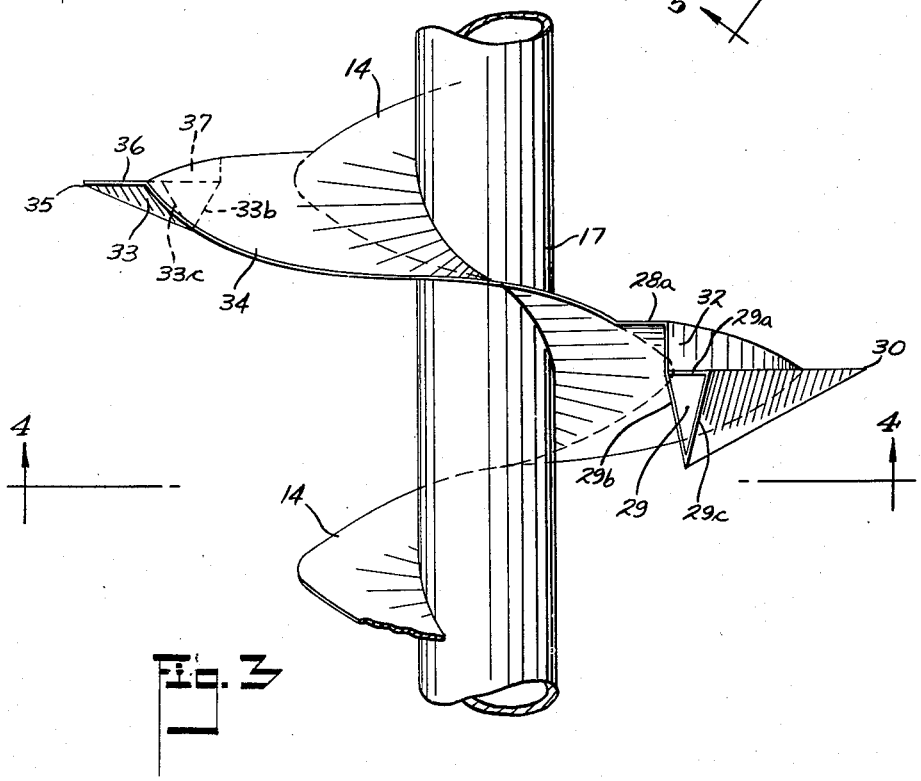
INVENTOR.
JOHN M. SHOUP
BY
Hyde, Meyer, Baldwin & Doran
ATTORNEYS Dec. 16, 1958 J. M. SHOUP 2,864,593
MIXER FOR FEED AND THE LIKE
Filed Jan. 6, 1958 3 Sheets-Sheet 3
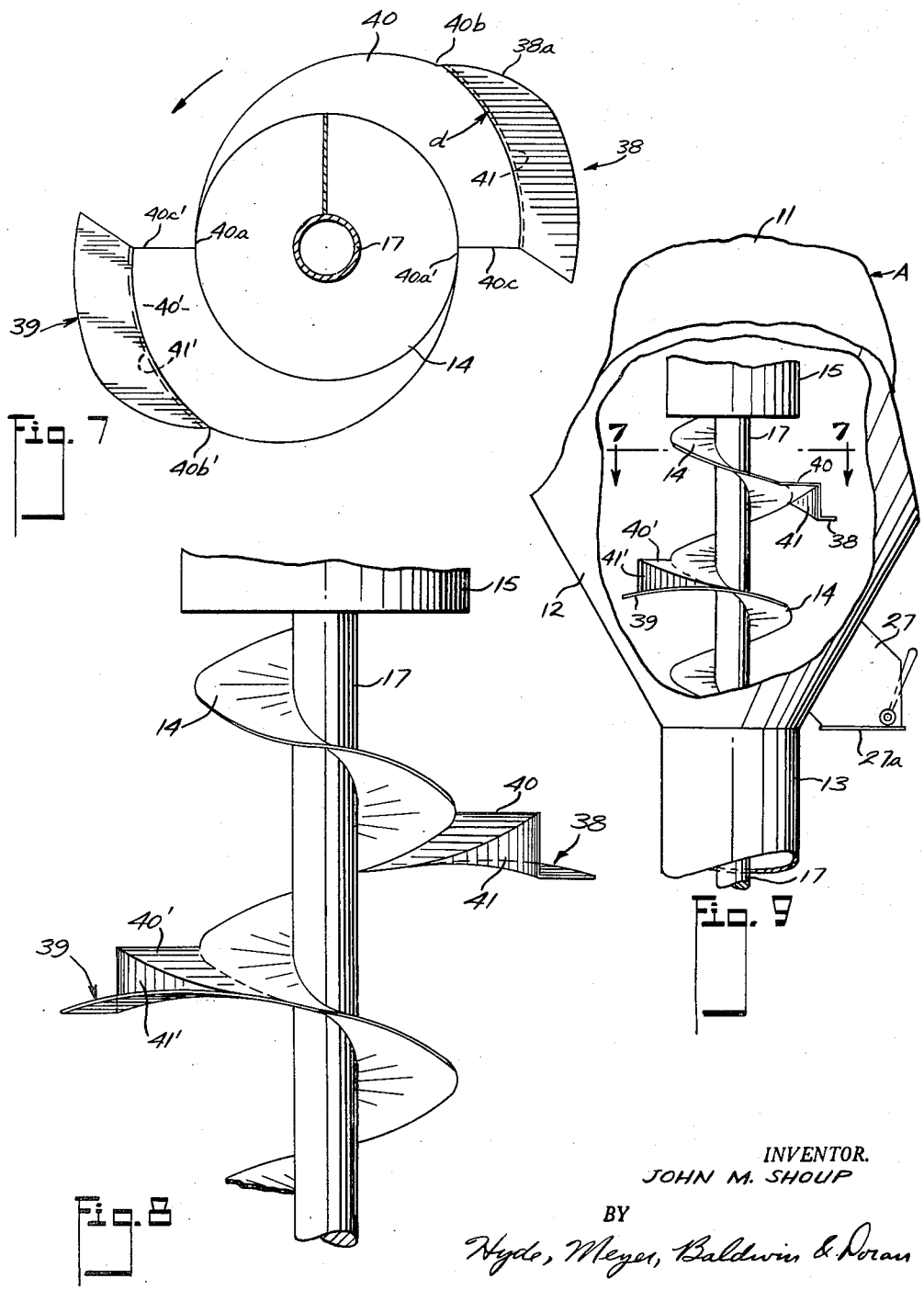
INVENTOR.
JOHN M. SHOUP
BY
Hyde, Meyer, Baldwin & Doran
ATTORNEYS

United States Patent Office 2,864,593
Patented Dec. 16, 1958

2,864,593
MIXER FOR FEED AND THE LIKE

John M. Shoup, Kent, Ohio

Application January 6, 1958, Serial No. 707,336

13 Claims. (Cl. 259—97)

This invention relates to improvements in a mixing device for finely divided bulky solid materials either with or without liquid additions. It is particularly useful for mixing grains such as corn and oats or finely chopped hay together with supplements such as minerals, bone meal and tankage, either with or without additions such a molasses, fish solubles, buttermilk and cattle medicines. Another use of my mixing device would be for mixing floor sweeping compounds including sawdust, ground corncobs and the like mixed with oil, wax, etc.

One of the objects of the present invention is to provide a mixer having a housing for containing the solid comminuted material to be mixed, this housing having an inwardly and downwardly converging portion at the lower end of the housing and having a rotatable spiral flight conveyor extending vertically substantially through the central zone of the housing and having a cylindrical shroud closely embracing a portion of the conveyor and stopping short of both the top and the bottom of the housing, this flight conveyor being rotatable to carry material upwardly. My invention adds to this old combination means for continuously exerting a downward pressure on the material in the converging portion of the housing outside of the periphery of the conveyor flight and below the shroud.

A preferred form of my mixer comprises a shoe movable with the flight conveyor, this shoe having a lower surface inclined downwardly and backwardly relative to the rotational movement of the periphery of a flight of said conveyor so as to give the downward pressure on the material in the converging portion of the housing as mentioned above.

A further refinement of my invention comprises a mixer having a flight conveyor as described above and having a shoe movable with the flights of the conveyor, this shoe having a surface inclined radially inwardly and backwardly relative to the rotational movement of the periphery of a flight of the conveyor so as to urge the finely divided material radially inwardly as it is being mixed and moved downwardly in the housing.

Other objects and advantages of my invention will be apparent from the accompanying drawings and description and the essential features thereof will be set forth in the appended claims.

In the drawings—

Fig. 1 is an elevational view of a mixer equipped with my invention, parts being broken away to more clearly show the contruction.

Fig. 2 is a fragmental cross sectional view, enlarged, taken along the line 2—2 of Fig. 1.

Fig. 3 is a fragmental elevational view of approximately two flights of the conveyor as shown in Fig. 2.

Fig. 4 is a bottom plan view reduced taken from the position of the line 4—4 of Fig. 3.

Figs. 5 and 6 are fragmental elevational views to the same scale as Fig. 4 and taken respectively from the position of the lines 5—5 and 6—6 of Fig. 2.

Figs. 7, 8 and 9 show another modification of my invention as applied to the vertical spiral flight conveyor, all other parts of the housing, etc., being like that shown in Fig. 1.

Fig. 7 is a fragmental sectional view, enlarged, taken along the line 7—7 of Fig. 9.

Fig. 8 is a fragmental elevational view of the device of Fig. 7; while

Fig. 9 is a fragmental view of a housing like that shown in Fig. 1 and broken away to show the vertical spiral flight conveyor.

In Fig. 1, I have shown a housing 10 of the type commonly used in cattle feed mixers of one to five ton capacity. Such a mixer has an upper cylindrical portion 11 which may be open or closed at the top, a closed type being shown here, and a generally conical lower portion 12, the sides of which incline downwardly and radially inwardly from the cylindrical portion, terminating in a shroud 13 which houses a vertically extending spiral flight conveyor 14. A cylindrical internal shroud 15 surrounds the conveyor 14 centrally of the cylindrical housing portion 11 and concentric with the axis thereof, this shroud being held in position by a small number of narrow but rigid arms 16. The shroud 15 terminates short of the top of the housing 10 as shown in Fig. 1. The conveyor 14 is of a usual type consisting of a thin metal sheet twisted spirally around a central shaft 17 with the pitch preferably being about equal to the outside diameter of the flights. The shaft 17 is supported in a bearing 18 secured to the cover 19 which in turn is fastened by means not shown to the top of the housing 10. The lower end of the shaft 17 is supported in a bearing 20 which is secured to a cap 21 fixed by means not shown to the lower end of the shroud 13. A pulley 22 is fixed to the upper end of shaft 17 so that the shaft may be rotated by means not shown for causing the conveyor 14 to rotate in such a direction as to lift material vertically upward.

Means is provided for feeding the material to be mixed to the lower end of the shroud 13. To this end, an arcuate door 23 is provided which is slidable vertically to cover or uncover an opening 24 at the lower end of shroud 13 permitting access of material to the flight conveyor. A feed trough 25 communicates at its lower end with the opening 24, and at its upper end with a grate or grille 26 which is a suitable opening through the floor so that material may be dumped down the trough or chute 25 to be fed to the flight conveyor. One or more chutes 27 communicate with the lower end of the conical housing portion 12. Each chute is provided with a gate 27a controlled by handle 27b and this permits sacking of the material after it has been mixed.

For the purpose of illustrating a specific form of my device, but in no sense limiting my invention to such dimensions, I may say that a feed mixer of two to two and one-half tons capacity would measure between fifteen and sixteen feet from the upper cover 19 to the lower cap 21. The diameter of the cylindrical housing portion 11 would be six to six and one-half feet, the inside diameter of the shrouds 13 and 15 would be about thirteen inches and the flight conveyor would be about twelve inches outside diameter. The vertical height of the housing portion 11 would be six feet or a little more. The vertical height of the conical portion 12 would be four feet or a little more and the length of the shroud portion 13 would be about five feet of which about two feet would be below the floor. The shroud 15 should terminate below the level A and I prefer that it terminate between six inches and two feet below the level A.

The operation of a feed mixer like that above described, and without my invention, is that material is fed into the housing 10 and is carried upwardly by the flight conveyor 14 through the shroud 15, discharging the same at the top, after which the material works down the annular outside space of the housing into the cone 12 and is carried back up the conveyor for continuous mixing. One of the chief disadvantages heretofore encountered with this type of mixer is the arching over of the material between the cone 12 and the shroud 15 at its lower end. This arching over the material interferes with the continuous operation of the mixer and also slows down the bagging at the chute 27. This problem arises in its worst form when mixing moist fresh grain, or mixing other materials to which has been added molasses or liquid drugs. Another difficult material to mix is very light feed such as ground dry fodder or corncobs. My improvement, as hereinafter described, obviates most of these difficulties.

My invention provides means for continuously exerting a downward pressure on the material in the converging or conical portion 12 of the housing outside of the periphery of the flights of the conveyor 14 and below the lower end of the shroud 15. A preferred form of my invention comprises one or more rigid extensions from a flight of the conveyor and located radially outside of the periphery of the upward-lifting flights of the conveyor and taking the form of a shoe which pushes the material downward outside of the periphery of the conveyor flights, while these flights are moving the material upward in the central portion of the housing.

In the form of my invention shown in Figs. 1 through 6, two shoes are provided spaced around the spiral conveyor approximately 180 degrees apart and each of these shoes being of generally triangular pyramid form and having the apex of the pyramid extending in the direction of flight rotation and having the upper face of the pyramid generally horizontal and having an inner face of the pyramid inclined radially inwardly and backwardly relative to the rotational movement of the periphery of a flight of the conveyor. Preferably, but not necessarily, one of these shoes may be somewhat larger than the other. Referring to the various views, a flight of the conveyor is provided with an outwardly extending shelf 28 which is substantially a continuation of the adjacent surfaces of the flight conveyor 14 which begins at the point B at the periphery of the twelve inch diameter flight of the conveyor and gradually extends outwardly to a point C where, in one form of my invention, it is approximately four inches radially outside the normal diameter of the flight conveyor. The shelf 28 then converges radially inwardly somewhat to the point B where it terminates in a short drop-off edge 28a. The edge between points B and C may be arcuate about the center E and the edge between D and C may be arcuately formed about the center F. In this case the shoe 29 for pressing downwardly and inwardly on the material being mixed is a generally triangular pyramid having its apex 30 turned in the general direction of flight rotation which is as indicated by the arrow in Fig. 2. It will also be noted in Fig. 2 that the slant sides of the pyramid are not straight lines but instead are slightly arcuate generally conforming to the curvature of the periphery of the flight conveyor 14. It will be noted that the apex 30 is radially outside the shelf 28 and in one form of my invention this distance is about two inches radially. The pyramid 29 leaves a generally triangular space at 31 which is filled in by a generally triangular shape fin. It will be noted that the upper side of the pyramid 29a and the fin 31 are substantially co-planar and extend generally horizontally although preferably it slopes downwardly slightly toward the base of the pyramid. This leaves a generally triangular space between the shelf 28 and the parts 29a, 31 which is filled in by a generally triangular flange 32 either integral with or rigidly secured to the portions 28 at the upper side and 29a and 31a at the lower side. The radially inner face of the pyramid 29b slopes downwardly and outwardly. The radially outer face of the pyramid 29c slopes downwardly and inwardly and preferably at the same angle to the vertical as the slant side of the conical wall of the portion 12 of the housing. The top face 29a of the pyramid is generally horizontal but preferably slopes slightly downwardly away from the apex 30. It results from this construction that as the conveyor 14 turns in the direction of the arrow of Fig. 2 so as to lift the material vertically along the conveyor, the flange 32 moves the material in the housing radially inwardly and the surface 29b moves the material both inwardly and downwardly.

A second shoe 33 of triangular pyramid shape is positioned on the next flight up along the conveyor and approximately 180 degrees opposite the pyramid 29. A shelf 34 begins at the periphery of the conveyor 14 and flares upwardly and radially outwardly in extension of the surface of the flight conveyor until it reaches the point G which in one form of my invention is approximately five inches radially outside the periphery of the flight conveyor. The shelf 34 then converges radially inwardly to the point H. This shelf has a radially extending drop-off edge 34a. Preferably, but not necessarily, the shelf edge from G to J may be arcuate about the center K and the edge from G to H may be arcuate about the center L. Here again the apex 35 of the pyramid 33 points in the general direction of rotation of the flight conveyor. The pyramid is connected by a generally triangular fin 36 with the shelf 34 and a generally triangular flange 37 fills the space similar to that already described in connection with the flange 32. The top wall 33a of this pyramid is generally horizontal although it slopes preferably slightly downwardly away from the apex 35. The inner wall 33b of this pyramid slopes downwardly and radially outwardly. The outer wall of the pyramid 33c slopes downwardly and radially inwardly and generally conforms to the slope of the cone 12. The operation of this pyramid 33 as the conveyor rotates is to provide a radially inward push by the flange 37 and inward and downward push by the wall 33b.

The operation of that form of my invention shown in Figs. 1 through 6 should now be apparent. The material to be mixed is fed through the grating 26 and chute 25 to the opening 24 in the bottom of shroud 13. The conveyor 14 is driven by pulley 22 in a direction to lift this material upwardly. The first fed material will spill over in the lower portion of the housing cone 12 but later will build up to the level of the shroud 15 and will then be carried up through this shroud, spilled over the top thereof and gradually fill up the complete housing 10. As the housing begins to be filled up, the material moving downwardly in the housing portions 11 and 12 outside of the shroud 15 will be pushed downwardly and moved radially inwardly by the shoes 29 and 33 by the action of shoe 29, flange 32, shoe 33 and flange 37 as previously described. This will keep the material moving and prevent arching between cone 12 and shroud 15 until the material is fully mixed after which the material may be sacked through one of the openings 27 and material will be continuously fed down to such sacking chutes without substantial delay. It will be noted that the shoe 29 and the shoe 33 are both in substantially the mid-portion of the cone 12, that is substantially half-way down the vertical height of the cone 12. Also, the shoe 29 is lower down in the cone where the pressure is greater and this shoe is larger but is somewhat closer to the central shaft 17 than the shoe 33. This smaller shoe is a little farther away from the rod 17 and, therefore, has a little longer lever arm from the shaft 17. The result is that the action of the large shoe 29 with the shorter lever arm substantially balances the action of the smaller shoe 33 with its longer lever arm. Also, the shoes 29 and 33 travel slightly different paths radially outward from the central shaft 17 so that a more thorough mixing occurs. It will be noted that I have shown the pyramids 29 and 33 as being formed of metal sheets hollow in the center. I may pour lead or other filler material into the hollows of pyramids 29 and/or 33 if necessary to balance the action of these two shoes about the central shaft 17.

A second form of my invention is shown in Figs. 7 through 9. As previously explained, the entire structure of Fig. 1 is utilized in this form of my invention with the single exception of the shoes attached to the flights of the spiral conveyor. Therefore, I have given similar reference characters to all of the parts which are identical with Fig. 1. Here two shoes 38 and 39 are secured to successive flights of the conveyor 14 at approximately 180 degrees from each other and since these two shoes are substantially identical, one only will be described and similar reference characters will be applied to the other. Referring to the shoe 38, a shelf 40 extends outwardly from the conveyor flight, this shelf being a substantial continuation of the surface of the spiral conveyor so that it serves to lift material in the same manner as the rest of the spiral conveyor when the conveyor is turned in the direction of the arrow of Fig. 7. This shelf 40 begins at the periphery of the conveyor at 40a and gradually diverges radially outwardly to a point 40b after which it converges radially inwardly slightly to a place where it terminates in the drop-off edge 40c. A flange 41, generally triangular in shape but bent arcuately about the shaft 17 as a center, fills in the space between the conveyor flight down to a generally horizontal shoe 38 which preferably subtends an arc of between 45 and 60 degrees about the axis of shaft 17. The leading edge of the shoe 38, as it turns, is bent in a smooth curve inwardly toward the shelf 40 so as to reduce the friction of this shoe moving through the material. It will be noted that the shoe 38 slopes slightly downwardly and backwardly from the point 40b with respect to the direction in which the flight conveyor turns. Thus, as the conveyor turns in a direction to lift material through the shroud 15, the shoe 38 tends to press downwardly on the material radially outside of the shelf 40. At the same time, the flange 41 tends to move some of the material radially inwardly as will be seen from Fig. 7. Similar reference characters with a prime suffix have been applied to the parts of shoe 39.

The operation of the form of my device shown in Figs. 7 through 9 should now be apparent. The material is fed into the device as described in connection with Fig. 1 and after there is sufficient load in the housing 10, material is lifted by the flight conveyor 14 vertically upward through shroud 15, spilled over the top of the shroud and moves down the outer parts of the housing 11 and 12 toward the bottom. It will be noted that here again the shoes 38 and 39 are in the midportion of the conical housing part 12 and material is lifted on the shelves 40 and 40' and drops off at 40c and 40c' in the same manner as material dropped off the shelf portions at 28a and 34a in the first described form of my invention. At the same time, the shoes 38 and 39 press downwardly upon the material radially outside of the flight conveyor and the flanges 41 and 41' move the material radially inwardly as the shoes pass through it.

In one form of my invention where the flight conveyor 14 is twelve inches outside diameter, the points 40b and 40' are approximately four inches radially outside of the normal diameter of the conveyor and the lips 40c and 40c' are approximately three and one-half inches in radial extent. Also, in this form of my invention, the shoes 38 and 39 are approximately two and one-quarter inches in radial extent at their greatest width.

I have thus provided in both forms of my invention an arrangement which adds very little to the cost of the equipment presently in use but which permits that equipment to operate more efficiently in mixing all materials and which permits that equipment to mix materials which could not be handled utilizing a simple flight conveyor 14 without my invention.

What is claimed is:

1. In a mixer having a housing for containing comminuted material to be mixed and having an inwardly and downwardly converging portion at the lower end of said housing and having a rotatable spiral flight conveyor extending vertically substantially through the central zone of said housing and having a cylindrical shroud closely embracing a portion of said conveyor and stopping short of both the top and bottom of said housing, said flight conveyor rotatable to carry material upwardly; the combination therewith of means for continuously exerting a downward pressure on material in said converging portion of said housing outside the periphery of said conveyor flights and below said shroud.

2. A mixer as in claim 1 wherein said last named means comprises a shoe movable with said conveyor, said shoe having a lower surface inclined downwardly and backwardly relative to the rotational movement of the periphery of a flight of said conveyor.

3. A mixer as in claim 2 wherein said shoe is a rigid extension of a flight of said conveyor and located radially outside of the periphery of the upward-lifting flights of said conveyor.

4. A mixer as in claim 1 wherein said last named means comprises a plurality of shoes movable arcuately with said conveyor, said shoes being substantially equally spaced arcuately about the axis of said conveyor, and having a lower surface inclined downwardly and backwardly relative to the rotational movement of the periphery of a flight of said conveyor.

5. A mixer as in claim 1 wherein said last named means comprises a shoe movable with said conveyor, said shoe having a surface bent radially inwardly and backwardly relative to the rotational movement of the periphery of a flight of said conveyor.

6. In a mixer having a housing for containing comminuted material to be mixed and having an inwardly and downwardly converging portion at the lower end of said housing and having a rotatable spiral flight conveyor extending vertically substantially through the central zone of said housing and having a cylindrical shroud closely embracing a portion of said conveyor and stopping short of both the top and bottom of said housing, said flight conveyor rotatable to carry material upwardly, and wherein said conveyor flights below said shroud have their outer edges lying on the surface of a cylinder of substantially uniform diameter, the combination therewith of at least two successive flights on said conveyor below said shroud each having a radially outwardly extending shelf extending beyond said uniform diameter and in conformity with the spiral convolution of said conveyor flights extended, and a shoe rigidly depending from each said shelf and radially outside thereof, each said shoe having a lower surface inclined downwardly and backwardly relative to the rotational movement of the periphery of a flight of said conveyor, said shoes being approximately diametrically opposite relative to the axis of said conveyor.

7. The combination of claim 6 wherein said two successive flights are vertically approximately midway of said converging portion of said housing.

8. In a mixer having a housing for containing comminuted material to be mixed and having an inwardly and downwardly converging portion at the lower end of said housing and having a rotatable spiral flight conveyor extending vertically substantially through the central zone of said housing and having a cylindrical shroud closely embracing a portion of said conveyor and stopping short of both the top and bottom of said housing, said flight conveyor rotatable to carry material upwardly, and wherein said conveyor flights below said shroud have their outer edges lying on the surface of a cylinder of substantially uniform diameter; the combination therewith of at least two successive flights on said conveyor below said shroud each having a radially outwardly extending shelf, each beginning at the periphery of a flight of said conveyor and extending through at least approximately a 90 degree arc progressively farther out radially beyond said uniform diameter and having an upper surface which is an extension of a lifting flight of said conveyor, and a shoe rigidly depending from each said shelf and radially outside thereof, each said shoe having a lower surface inclined downwardly and backwardly relative to the rotational movement of the periphery of a flight of said conveyor; said shoes being approximately diametrically opposite relative to the axis of said conveyor.

9. The combination of claim 8 wherein said two successive flights are vertically approximately midway of said converging portion of said housing.

10. In a mixer having a housing for containing comminuted material to be mixed and having an inwardly and downwardly converging portion at the lower end of said housing and having a rotatable spiral flight conveyor extending vertically substantially through the central zone of said housing and having a cylindrical shroud closely embracing a portion of said conveyor and stopping short of both the top and bottom of said housing, said flight conveyor rotatable to carry material upwardly, and wherein said conveyor flights below said shroud have their outer edges lying on the surface of a cylinder of substantially uniform diameter; the combination therewith of at least two successive flights on said conveyor below said shroud each having a radially outwardly extending shelf, each beginning at the periphery of a flight of said conveyor and extending through approximately at least a 90 degree arc progressively farther out radially beyond said uniform diameter and having an upper surface which is an extension of a lifting flight of said conveyor, and a shoe rigidly depending from each said shelf and radially outside thereof, each said shoe being of generally triangular pyramid form and having the apex of the pyramid extending in the direction of flight rotation and having the upper face of the pyramid generally horizontal and having an inner face of said pyramid inclined radially inwardly and backwardly relative to the rotational movement of the periphery of a flight of said conveyor.

11. The combination of claim 10 wherein the pyramid has an outer face inclined toward the axis of said conveyor at approximately the same angle as the adjacent inwardly and downwardly converging wall of said converging portion of said housing.

12. The combination of claim 10 wherein said two shoes are on two flights one of which is higher in the housing than the other, and said shoe on the higher of said flights has less arcuate extent than said shoe on the lower of said flights.

13. The combination of claim 10 wherein said two shoes are on two flights one of which is higher in the housing than the other, and said shoe on the higher of said flights is spaced radially farther from the axis of said conveyor than said shoe on the lower of said flights.

References Cited in the file of this patent
UNITED STATES PATENTS

| | | |
|---|---|---|
| 301,506 | Massey | July 8, 1884 |
| 1,575,584 | Kermer | Mar. 2, 1926 |
| 2,731,248 | Fisher | Jan. 17, 1950 |